(12) United States Patent
Kim et al.

(10) Patent No.: US 11,834,007 B2
(45) Date of Patent: Dec. 5, 2023

(54) INDICATOR FOR WIPER BLADE AND WIPER BLADE

(71) Applicant: CAP CORPORATION, Gyeongsangbuk-Do (KR)

(72) Inventors: Tae Hun Kim, Daegu (KR); Young Min Lee, Daegu (KR); Byoung Yong Ryu, Gyeongsangbuk-do (KR)

(73) Assignee: CAP Corporation, Gyeongsangbuk-do (KR)

( * ) Notice: Subject to any disclaimer, the term of this patent is extended or adjusted under 35 U.S.C. 154(b) by 0 days.

(21) Appl. No.: 17/872,179

(22) Filed: Jul. 25, 2022

(65) Prior Publication Data
US 2023/0036500 A1    Feb. 2, 2023

(30) Foreign Application Priority Data

Jul. 27, 2021  (KR) .......................... 10-2021-0098804

(51) Int. Cl.
*B60S 1/04*    (2006.01)
*B60S 1/38*    (2006.01)

(52) U.S. Cl.
CPC ............. *B60S 1/0491* (2013.01); *B60S 1/38* (2013.01); *B60S 2001/3844* (2013.01)

(58) Field of Classification Search
CPC ... B60S 2001/3844; B60S 1/0491; B60S 1/08
See application file for complete search history.

(56) References Cited

U.S. PATENT DOCUMENTS

| 8,468,643 B2 * | 6/2013 | Kim ....................... B60S 1/38 |
| | | 15/250.361 |
| 8,890,074 B2 | 11/2014 | Kim et al. |
| 2015/0135462 A1 * | 5/2015 | Caillot ................. B60S 1/3805 |
| | | 15/250.04 |
| 2020/0108802 A1 * | 4/2020 | Jung ................... G02B 27/0006 |
| 2021/0162955 A1 * | 6/2021 | Kim ....................... B60S 1/4003 |

FOREIGN PATENT DOCUMENTS

| CN | 103847632 A | 6/2014 |
| CN | 206900303 U | 1/2018 |
| CN | 207790625 U | 8/2018 |

(Continued)

OTHER PUBLICATIONS

CN103847632A (machine translation) (Year: 2014).*

(Continued)

*Primary Examiner* — Andrew A Horton
(74) *Attorney, Agent, or Firm* — IP & T GROUP LLP

(57) ABSTRACT

The present disclosure relates to an indicator for a wiper blade and a wiper blade. The indicator is a device for a wiper blade detachably provided on a wiper arm for cleaning a windshield, including: a main body provided on the wiper blade or the wiper arm; a notifier provided in the main body and configured to generate a light signal that is identifiable with naked eyes; and a controller configured to control an operation of the notifier, wherein the controller is configured to count the accumulated time from a start time at which an external operation is input regardless of whether the wiper blade operates so as to operate the notifier when the accumulated time reaches a predetermine time.

11 Claims, 15 Drawing Sheets

(56) References Cited

FOREIGN PATENT DOCUMENTS

| | | | |
|---|---|---|---|
| CN | 112082746 | A | 12/2020 |
| EP | 2048047 | B1 | 2/2015 |
| JP | 2015-098319 | A | 5/2015 |
| KR | 10-1997-0040175 | A | 7/1997 |
| KR | 10-1997-0040176 | A | 7/1997 |
| KR | 10-0444019 | B1 | 8/2004 |
| KR | 10-0494620 | B1 | 6/2005 |
| KR | 10-2010-0095848 | A | 9/2010 |
| KR | 10-1053022 | B1 | 8/2011 |
| KR | 10-1327031 | B1 | 11/2013 |
| KR | 10-1895762 | B1 | 9/2018 |

OTHER PUBLICATIONS

Office Action for the Korean Patent Application No. 10-2021-0098804 issued by the Korean Intellectual Property Office dated Oct. 10, 2022.

\* cited by examiner

INDICATOR FOR WIPER BLADE AND WIPER BLADE

CROSS-REFERENCE TO RELATED APPLICATION

The present application claims priority under 35 U.S.C. § 119(a) to Korean patent application number 10-2021-0098804 filed on Jul. 27, 2021, in the Korean Intellectual Property Office, the entire disclosure of which is incorporated by reference herein.

BACKGROUND

Technical Field

The present disclosure relates to an indicator for a wiper blade and a wiper blade including the same.

Related Art

In general, a wiper device is installed in a vehicle to wipe the surface of a windshield. Such the wiper device includes a wiper motor, a wiper arm, and a wiper blade, and an adapter may be used for structural connection between the wiper arm and the wiper blade.

The wiper arm is connected to a rotation shaft of the wiper motor at the base end to reciprocate by the wiper motor, and one or more wiper arms are provided depending on the size of the windshield. When provided in plurality, the wiper arms are provided to prevent the reciprocal rotation from interfering.

In addition, the wiper blade is also detachably coupled to the end of the wiper arm through the adapter. The wiper blade is provided in a form of a straight line and performs wiping functions by sliding the surface of the windshield in accordance with the movement of the rotating wiper arm while maintaining a state of being in close contact with the windshield.

Such the wiper blade may be continuously rubbed by the windshield in a state of being installed in the vehicle, causing abrasion as the period of use has elapsed, generation of unnecessary noise, or deterioration in the wiping performance for the surface. Accordingly, users used to replace the wiper blade when they notice an increase in the noise generated from the wiper blade or the deterioration in the wiping performance of the windshield.

However, such the replacement of the wiper blade is carried out after the desired replacement time has passed. As a result, the wiper blade that has lost the proper wiping performance for a target of close contact is continuously used, becoming a factor threatening safe driving due to incomplete visibility.

SUMMARY

The present disclosure has been made in an effort to solve the issues of the related art as described above. Embodiments provide an indicator for a wiper blade and a wiper blade capable of ensuring optimal performance of the wiper blade by indicating an appropriate replacement time through calculation of only an elapsed time after installation of the wiper blade with no need to count a wiping operation or check the state of a target of close contact.

In accordance with an aspect of the present disclosure, there is provided an indicator for a wiper blade which is a device for the wiper blade detachably provided on a wiper arm for cleaning a windshield, including: a main body provided on the wiper blade or the wiper arm; a notifier provided in the main body and configured to generate a light signal that is identifiable with naked eyes; and a controller configured to control an operation of the notifier, wherein the controller is configured to count accumulated time from a start time at which an external operation is input regardless of whether the wiper blade operates so as to operate the notifier when the accumulated time reaches a predetermine time.

Specifically, the wiper blade may be configured to perform cleaning by repeating a constant movement in a state of being in close contact with the windshield by means of the wiper arm rotated by a driving source, and the controller may be configured to count only the accumulated time regardless of the movement of the wiper blade.

Specifically, the controller may have a circuit blocked by a removable tap and may be configured to count the accumulated time by setting a time at which the tap is removed by an external force to make the circuit electrified as the start time.

Specifically, the controller may have a button operated by pressing or touching, and may be configured to count the accumulated time by setting a time at which the button is pressed or touched as the start time.

Specifically, the controller may be configured to cause the notifier to generate a first light signal when the start time is set and cause the notifier to generate a second light signal that is the same or more emphasized than the first light signal when the accumulated time reaches the predetermined time.

Specifically, the controller may be configured to cause the notifier to generate a third light signal that is less emphasized than the first light signal or the second light signal from the start time until the accumulated time reaches the predetermined time.

Specifically, the wiper blade may include: a contact member connected to an end of the wiper arm through an adapter and configured to be in close contact with the windshield; an elastic member configured to provide an elastic force in a direction of being in close contact with the contact member; a cover member configured to cover the elastic member; and a coupling cover provided in the center and to which the adapter is coupled, wherein the main body may be provided on at least one of the cover member and the coupling cover, and an exposed portion configured to expose the light signal of the notifier to the outside may be provided on the cover member or the coupling cover.

Specifically, the wiper blade may include a contact member configured to be in close contact with the windshield; an elastic member configured to provide an elastic force in a direction of being in close contact with the contact member; and a cover member configured to cover the elastic member, wherein the cover member may have a seating portion recessed to allow the main body to be seated therein, and the main body may be installed in the seating portion of the cover member to expose the light signal of the notifier to the outside.

Specifically, the wiper blade may include a contact member configured to be in close contact with the windshield; an elastic member configured to provide an elastic force in a direction of being in close contact with the contact member; a cover member configured to cover the elastic member; and a closing cover provided on each of both ends in its longitudinal direction, wherein the main body may be provided on at least one of the cover member and the closing cover, and an exposed portion configured to expose the light signal of the notifier to the outside may be provided on the cover member or the closing cover.

Specifically, the wiper blade may be coupled to an end of the wiper arm through an adapter, the adapter may have a seating portion recessed to allow the main body to be seated therein, and the main body may be installed in the seating portion of the adapter to expose the light signal of the notifier to the outside.

Specifically, the wiper blade may be coupled to an end of the wiper arm through an adapter, the main body may be provided in the adapter, and an exposed portion configured to expose the light signal of the notifier to the outside may be provided in the adapter.

In accordance with another aspect of the present disclosure, there is provided a wiper blade provided with the indicator.

An indicator for a wiper blade and a wiper blade according to an embodiment of the present disclosure may count only the accumulated time without considering other external conditions after installation of the wiper blade with respect to a target of close contact to indicate the replacement time using light, for example, thereby realizing a simple and intuitive alarm.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The objects, specific advantages, and novel features of the present disclosure will become more apparent from the following detailed description and preferred embodiments taken in conjunction with the accompanying drawings. In adding reference numbers to components of each drawing in the present specification, it should be noted that only the same components are given with the same number as much as possible even if the components are shown in different drawings. In addition, describing the present disclosure, if it is determined that the detailed description of a related known technology may unnecessarily obscure the gist of the present disclosure, the detailed description thereof will be omitted.

Hereinafter, a wiper blade according to an embodiment the present disclosure will be described with reference to the drawings. However, in the present disclosure, it should be noted that the wiper blade may be interpreted as encompassing an adapter or, further, a wiper arm, in addition to a portion that slides in direct contact with a target of close contact such as a windshield.

For reference, the longitudinal direction as used hereinafter refers to a direction that the wiper blade extends long, and may refer to a left-right direction with reference to FIG. 1. In addition, the width direction refers to a direction perpendicular to the length direction.

Figure 1:
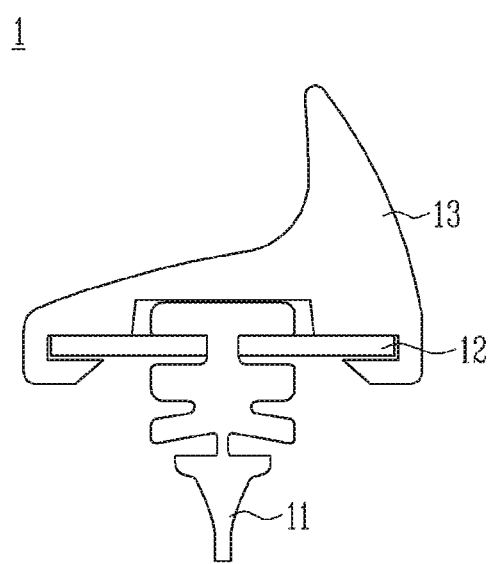
FIG. 1 illustrates a cross-sectional view of a wiper blade in accordance with a plurality of embodiments of the present disclosure.

In addition, the height direction may refer to a direction away from the target of close contact to which the wiper blade is in contact with, and may also refer to a vertical direction with reference to FIG. 1. Of course, it should be noted that the above direction does not limit the right of the present disclosure. Rather, it is only for the convenience in describing the present disclosure.

In addition, the movement or motion described in the present specification is relative, and a configuration other than a moving object will not necessarily be construed to be limited in a fixed position. In addition, expressions such as coupling, fastening, interlocking, or fixing in the present specification encompass a case that two configurations act indirectly with the other configuration interposed therebetween, in addition to a case that the two configurations act directly.

FIG. 1 illustrates cross-sectional view of a wiper blade in accordance with a plurality of embodiments of the present disclosure.

Hereinafter, prior to describing an indicator 100 for a wiper blade of the present disclosure, a structure of a wiper blade 1 of the present disclosure will be described first.

The wiper blade 1 is configured to clean the surface of a target of close contact through the movement after coming in close contact with the surface thereof. In this case, as mentioned above, the target of close contact may be any object that is cleaned by sliding motion, such as a windshield of a vehicle. Such the wiper blade 1 may include a contact member 11, an elastic member 12, a cover member 13, and a coupling cover 14.

The contact member 11 is in direct contact with the surface of the target of close contact and slides along the surface. The contact member 11 has a cross-sectional structure that allows smooth sliding for cleaning by appropriately rubbing the surface while being in close contact with the surface. For example, the contact member 11 may have a V-shaped cross-section extending along the longitudinal direction.

In other words, the contact member 11 may be provided in a form that the contact area with the target of close contact is reduced. In addition, the contact member 11 may be made of a material such as rubber having a buffering power for the close contact with the surface.

The contact member 11 may have a contact side (reference number not shown) whose shape is different from the surface of the target of close contact in a state with no external force applied. However, when the wiper blade 1 is coupled to a wiper arm by an adapter 16 while receiving an elastic force by the elastic member 12, the contact member 11 is pressed toward the target of close contact to make the contact side naturally transformed in a shape identical to the surface of the target of close contact.

The contact member 11 may be engaged with the elastic member 12, and the contact member 11 and the elastic member 12 may be connected to each other via a method in which the elastic member 12 is inserted into a trough (reference number not shown) provided in the contact member 11 in the width direction.

However, the contact member 11 and the elastic member 12 may not be strongly fastened only by coupling with each other. The elastic member 12 has an inner side placed on the contact member 11 and an outer side surrounded by a cover member 13 to be described later, so as to be fixed between the contact member 11 and the cover member (13).

The elastic member 12 is configured to apply an elastic force to the contact member 11. The elastic member 12 is made of a material (such as metal) more rigid than the contact member 11 or the cover member 13 to be described later, and may be configured to maintain a long shape of the wiper blade 1.

For example, the elastic member 12 may be provided in the form of a leaf spring, but as long as the contact member 11 is able to be in close contact with the target of close contact as a whole, the structure or material may be changed freely.

The elastic member 12 may be provided as a pair and provided on both sides of the contact member 11 in the width direction. To this end, the contact member 11 may be provided with troughs at both sides for insertion of the elastic member 12, respectively.

The elastic member 12 applies an elastic force for returning to a curved shape that is more curved than the surface of the target of close contact with respect to the contact member 11. Therefore, when the contact member 11 is pressed against the target of close contact by the wiper arm, the contact side of the contact member 11 applies a force to push the target of close contact while being transformed, but may be strongly in contact with the target of close contact while maintaining a state of being pressed by the wiper arm.

The cover member 13 is provided on the opposite side of the target of close contact in the contact member 11. The cover member 13 closes a coupling portion between the contact member 11 and the elastic member 12 to secure aesthetic effects and prevent separation of the elastic member 12.

Specifically, the cover member 13 has a structure with a cross-section formed in a U-shape that both sides surround the elastic member 12 inserted into the trough 112 of the contact member 11 in the width direction, so as to cover up the inner side of the elastic member 12 with the contact member 11 in the width direction and the outer side with the cover member 13.

In other words, the cover member 13 and the contact member 11 may be coupled with the elastic member 12 interposed therebetween. Of course, various fixing structures other than the above method may be applied.

A lower portion of the cover member 13 may be provided to cover the elastic member 12 coupled to the contact member 11 as above, whereas an upper portion of the cover member 13 may be a portion exposed to the outside by being placed on the target of close contact.

In this case, the upper portion of the cover member 13 may be provided in a structure free from wind resistance by dispersing the wind in order to prevent the wiper blade 1 from moving or floating by the wind during the driving of a vehicle.

For example, the upper portion of the cover member 13 may have an A-shaped or mountain-shaped cross-section extending along the longitudinal direction, or a cross-section wrinkled like waves extending along the longitudinal direction. In this case, the shape or position of the wrinkle may be provided asymmetrically. Therefore, even when the vehicle travels at a high speed, the cover member 13 disperses the wind to the surface of the target of close contact to prevent the contact member 11 from floating from the target of close contact.

Of course, since the contact member 11 may be fixed at a certain position on the target of close contact by the wiper arm, the upper portion of the cover member 13 may be provided in various structures other than the above-mentioned shape in consideration of wind resistance or aesthetic effects.

The cover member 13 may be provided in a structure or made of a material more rigid than the contact member 11, and as the elastic member 12 is accommodated between the cover member 13 and the contact member 11, the elastic member 12 made of metal is surrounded by the cover member 13 and the contact member 11 to prevent contact with moisture, thereby suppressing rust generation.

A pair of the cover members 13 may be provided separately along the longitudinal direction. This is intended to couple the coupling cover 14 or adapter 16, which will be described later, to the central portion of the wiper blade 1 in the longitudinal direction.

In other words, the pair of cover members 13 may be provided on one side and the other side of the coupling cover 14 based on the longitudinal direction, and the coupling cover 14 may be provided to at least partially overlap with the pair of cover members 13, thereby minimizing a gap between the cover member 13 and the coupling cover 14.

The coupling cover 14 is provided at the central portion of the wiper blade 1 as a configuration for coupling with the wiper arm 10. The coupling cover 14 may be a configuration for the coupling that allows the wiper blade 1 to hingedly rotate around the adapter 16.

For example, the coupling cover 14 and the adapter 16 may form a hinge shaft and a structure that rotates around the hinge shaft during the coupling. At this time, the coupling cover 14 may have a coupling hole in order to form a rotating structure.

Of course, the shape or structure of the coupling cover 14 is not limited for the coupling of the adapter 16 having various shapes that are not limited. As an example, the coupling cover 14 may be provided at a point (preferably, a central portion in the longitudinal direction) of the wiper blade 1, and in this case, the coupling cover 14 may be smoothly integrated with the cover member 13 on both sides as shown in FIG. 2.

Figure 6:
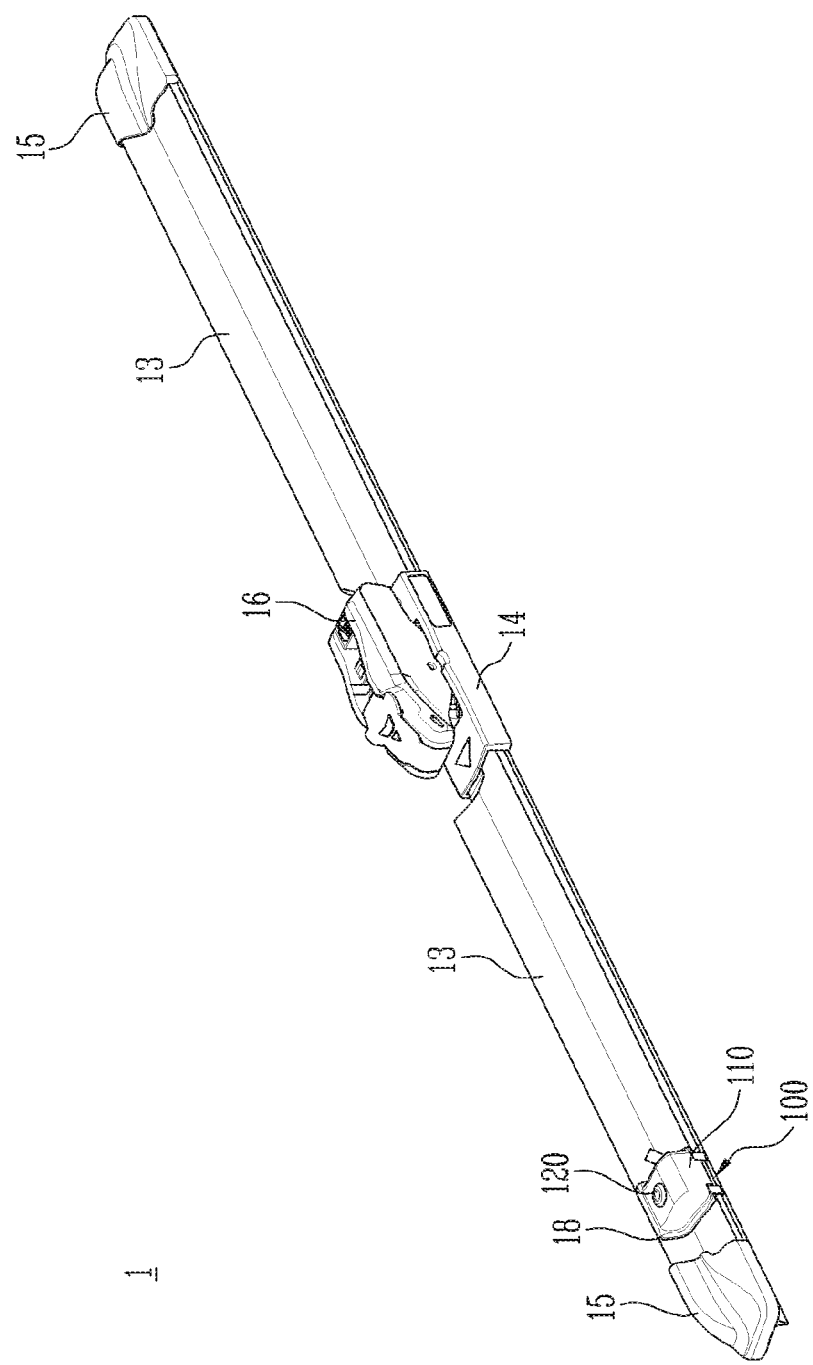
FIG. 6 illustrates a perspective view of a wiper blade in accordance with a second embodiment of the present disclosure.

Alternatively, as shown in FIG. 6, the coupling cover 14 and the cover member 13 may be provided separately, and the cover member 13 may be disposed on both sides of the coupling cover 14 in the longitudinal direction. In other words, the coupling cover 14 and the cover member 13 may be integrated or provided independently.

In the case of an embodiment shown in FIG. 6, the wiper blade 1 may further include a closing cover 15 at each of both ends in its longitudinal direction. The closing covers 15 are configured to be coupled to cover up both ends of the cover member 13 and the contact member 11 in order to close both ends of the cover member 13 and the contact member 11 and prevent introduction of moisture into the elastic member 12.

Figure 2:
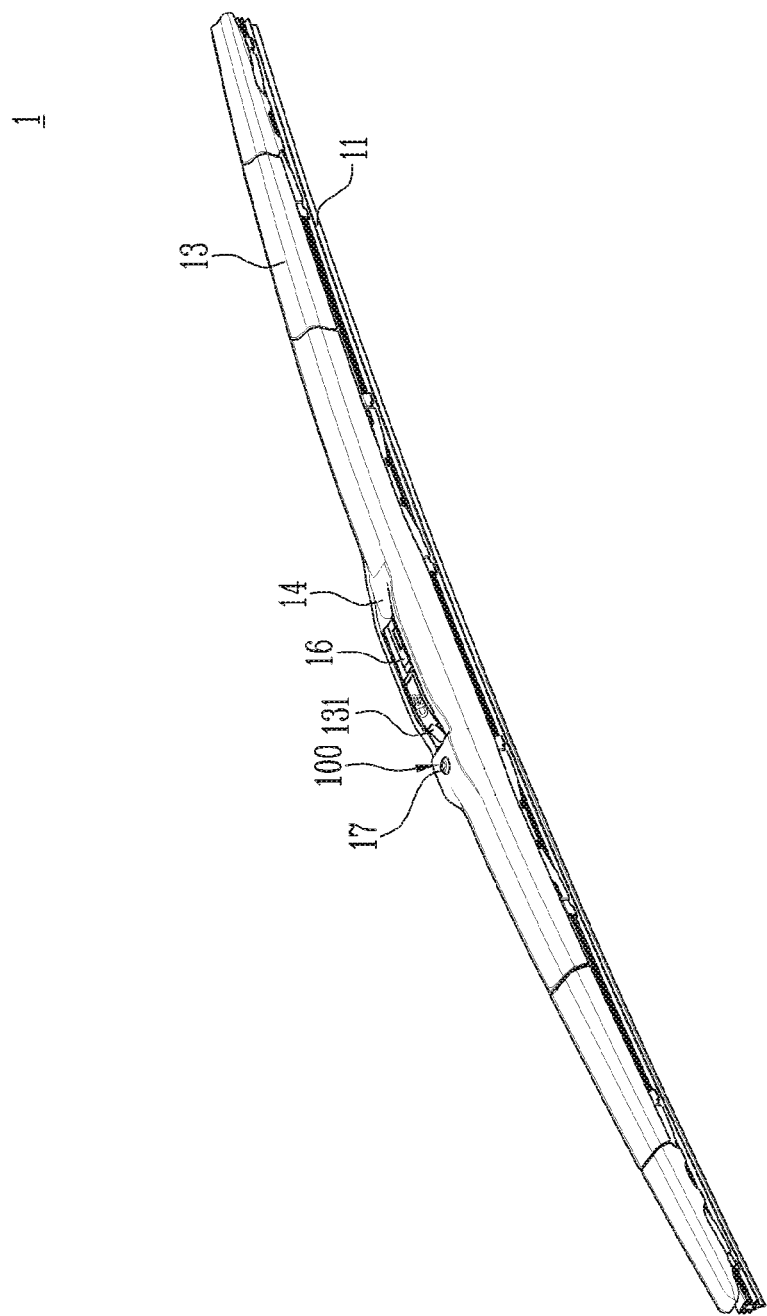
FIG. 2 illustrates a perspective view of a wiper blade in accordance with a first embodiment of the present disclosure.

Of course, depending on the shape of the cover member 13 or the contact member 11, the closing cover 15 may be transformed freely, or if possible, omission of the closing cover 15 may be possible as shown in FIG. 2.

Hereinafter, based on the structure of the wiper blade 1 described above, the indicator 100 for a wiper blade applied to the wiper blade 1 will be described in detail for each embodiment. However, it should be noted that the overlapping parts of embodiments may be replaced with the contents described in other embodiments.

Figure 3:
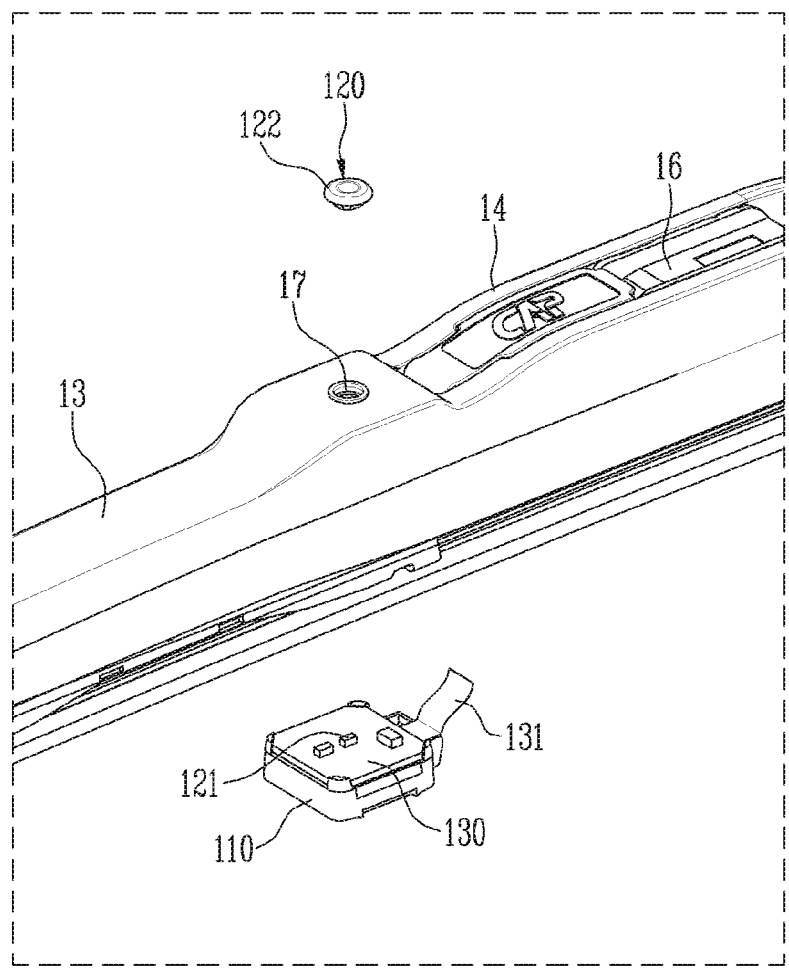
FIG. 3 illustrates a partial perspective view of the wiper blade in accordance with the first embodiment of the present disclosure.
Figure 4:
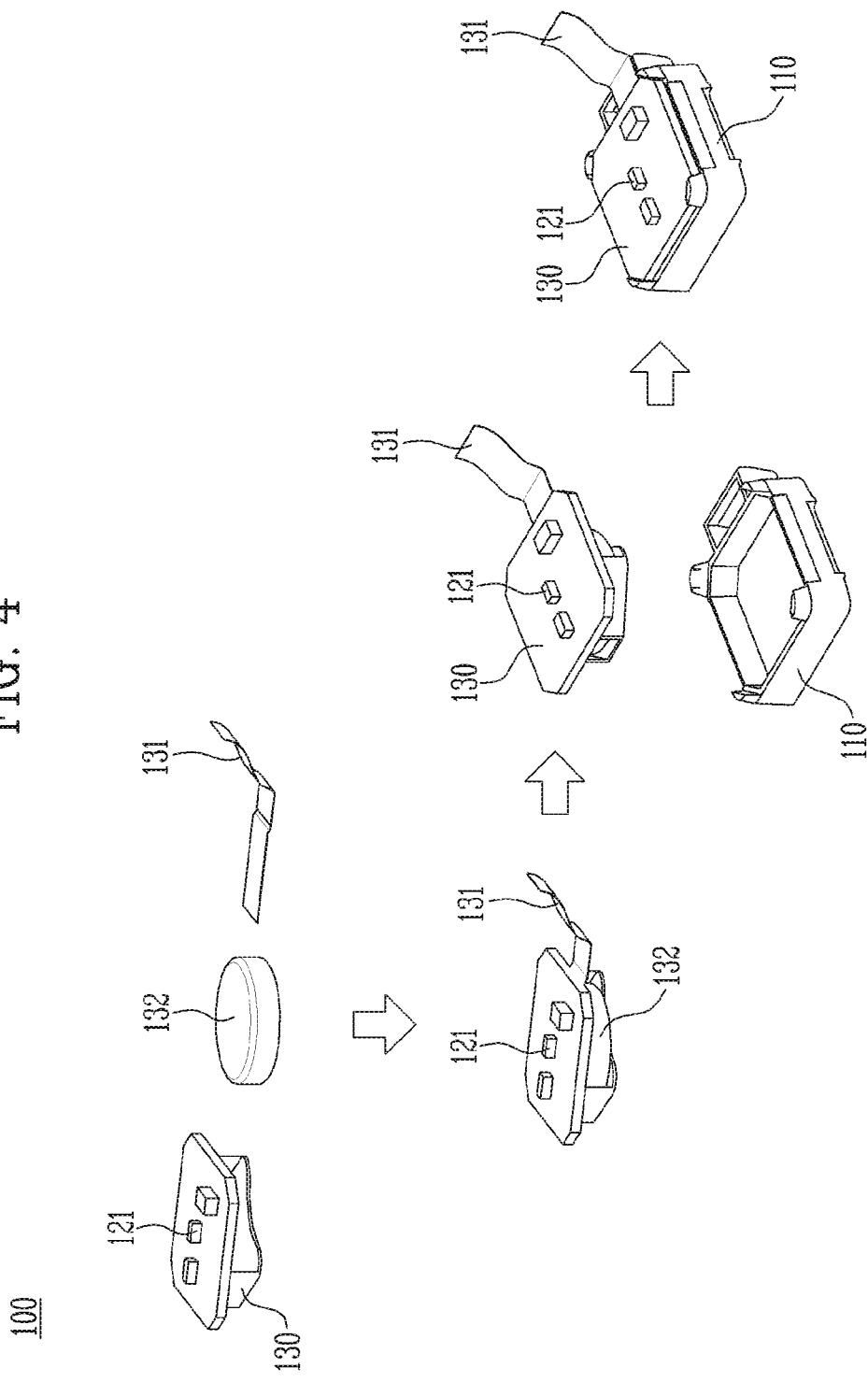
FIG. 4 illustrates an assembly view of an indicator for the wiper blade in accordance with the first embodiment of the present disclosure.
Figure 5:
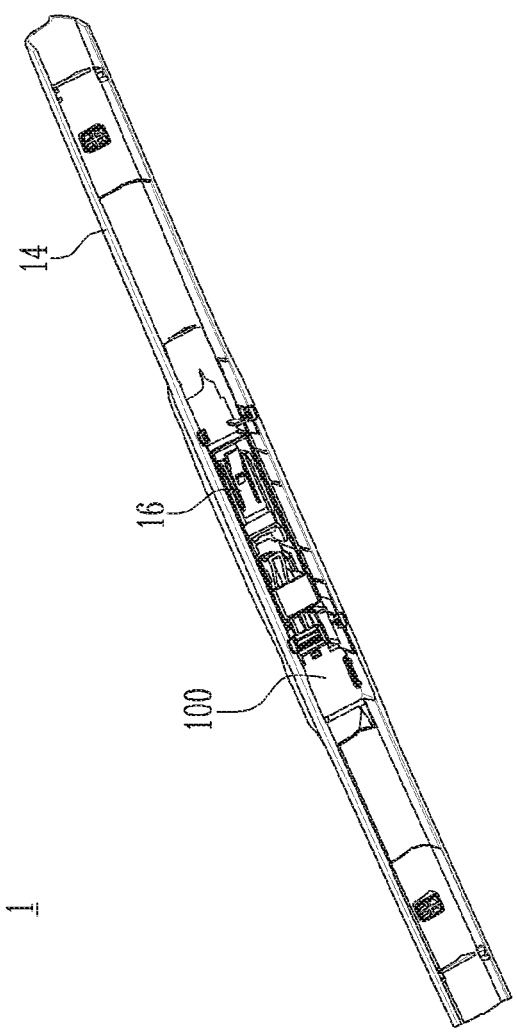
FIG. 5 illustrates a partial perspective view of the wiper blade in accordance with the first embodiment of the present disclosure.

FIG. 2 illustrates a perspective view of the wiper blade in accordance with a first embodiment of the present disclosure, FIG. 3 illustrates a partial perspective view of the wiper blade in accordance with the first embodiment of the present disclosure, FIG. 4 illustrates an assembly view of the indicator for a wiper blade in accordance with the first embodiment of the present disclosure, and FIG. 5 illustrates a partial perspective view of the wiper blade in accordance with the first embodiment of the present disclosure.

Referring to FIGS. 2 to 5, the wiper blade 1 according to the first embodiment of the present disclosure may have a shape that the cover member 13 is smoothly coupled to both sides of the coupling cover 14 without disconnection, and may be provided in a form without (or minimized) the closing cover 15.

The indicator 100 for a wiper blade of an embodiment is designed to notify the replacement time for the wiper blade 1 provided to be detachable to and from the wiper arm in order to clean the windshield, including a main body 110, a notifier 120, and a controller 130.

The main body 110 is a part for the indicator 100 for a wiper blade to be coupled to the wiper blade 1, and in particular, may be configured to function as a housing for accommodating the notifier 120 or the controller 130.

The main body 110 may be installed on the wiper blade 1 or the wiper arm, but for example, the main body 110 of an embodiment may be provided on the coupling cover 14 of the wiper blade 1. The adapter 16 is installed on the coupling cover 14, and the wiper blade 1 may be fastened to the wiper arm through the adapter 16, wherein the main body 110 may be installed in the coupling cover 14 at a position not interfering with the installation of the adapter 16.

The main body 110 may have a structure allowing a light signal generated in the notifier 120 to be exposed to the outside. For example, the main body 110 may have a form that a light emitting diode 121 included in the notifier 120 is identifiable with the naked eye from the outside or a semi-transparent/transparent/open structure through which the light signal partially leaks out. Alternatively, a lens 122 configured to emit a light signal is installed in the main body 110 to allow a user to easily check the light signal.

The notifier 120 is provided in the main body 110 and configured to generate a light signal that is identifiable with the naked eye. The notifier 120 may include, for example, one or more light emitting diodes 121, and the light emitting diodes 121 may emit light at an appropriate time by an operation of the controller 130 to be described later. The light signal generated from the light emitting diodes 121 may be exposed to the outside.

In addition, the notifier 120 may have the lens 122 for efficient transmission of the light signal, and the lens 122 may be installed on a surface exposed to the outside from the main body 110. Accordingly, the light signal generated by the operation of the light emitting diode 121 may be transmitted to the eyes of a user through the lens 122.

In addition, various configurations that are not limited may be added in order to efficiently transmit a light signal to the user. For example, a reflective member (not shown) may be added to allow the light signal generated from the wiper blade 1 to be smoothly and safely transmitted to the user in the vehicle.

The notifier 120 may emit the light signal to the outside through the main body 110 while being provided inside the main body 110. Alternatively, a portion of the notifier 120 may be provided inside the main body 110 while the remaining portion for emitting the light signal may be provided outside the main body 110.

The controller 130 is configured to control the operation of the notifier 120. The notifier 120 may guide the replacement time for the wiper blade 1 by emitting the light signal by the controller 130. In particular, the controller 130 of the present disclosure may count the accumulated time regardless of whether the wiper blade 1 operates and operate the notifier 120 when the accumulated time reaches a predetermined time.

In other words, the present disclosure simply considers the accumulated time, not the variables such as counting of the number of rotations of the wiper blade 1, checking of the state of a target of close contact, or checking of a change in noise.

The wiper blade 1 may be packaged to be sold. From the moment that the packaging is removed, the durability of the wiper blade 1 starts deteriorating, and service life thereof is about 6 months regardless of the operation of the wiper blade 1. If 6 months have elapsed, wiping performance may not be properly secured, and improper wiping of the wiper blade 1 may cause an accident.

As described above, considering that the lifetime of the wiper blade 1 is most dependent on the passage of time regardless of wiping, the indicator 100 for a wiper blade of the present disclosure counts only the accumulated time to notify the replacement time for the wiper blade 1 and to accurately inform the service life of the wiper blade 1 with proper performance ensured, thereby preventing a potential accident in advance.

In addition, since the present disclosure minimizes the usage of a battery 132, it is possible to use the light signal for notifying the replacement time with sufficient intensity (for example, a form in which the light signal is maintained for 30 days or longer).

The controller 130 in the indicator 100 for a wiper blade may count the accumulated time from the starting point when an external manipulation is input regardless of whether the wiper blade 1 operates, and operate the notifier 120 when the accumulated time reaches a predetermined time. In other words, the controller 130 counts the accumulated time only regardless of the movement of the wiper blade 1.

The controller 130 may have a removable tab 131 and include a battery 132. The tab 131 may have one end that extends outside the main body 110 and is exposed to be accessible by a user while having a structure gripped by user's fingers to be pulled out.

The tab 131 may be provided to block power transmitted by the battery 132. The battery 132 may provide power for the operation of an accumulated time count circuit (not shown) built in the controller 130. In a state in which the tap 131 is provided, power transmission from the battery 132 to the circuit is blocked, stopping the counting of the accumulated time.

However, when the user removes the tap 131, the counting of the accumulated time begins by the circuit as the battery 132 is connected to the circuit. In other words, a time when the tap 131 is removed by an external force to make the circuit electrified is set as a start time, and the circuit may count the accumulated time automatically from the start time.

In this case, the controller 130 may utilize the notifier 120 to inform the user of the setting of the start time. In other words, the controller 130 causes the notifier 120 to generate the first light signal when the start time is set, and when the accumulated time reaches the predetermined time, the controller 130 causes the notifier 120 to generate a second light signal that is more emphasized than the first light signal.

For example, the first light signal may blink once per second for a first time, and the second light signal may blink once or more per second for a second time (e.g., 1 month or longer) longer than the first time. Alternatively, the blinking period of the first light signal may be longer than that of the second light signal.

In other words, the controller 130 may inform the user of the start time and the replacement time by using the first light signal and the second light signal that are different from each other or the same, and cause the notifier 120 not to generate the light signal between the start time and the replacement time.

However, in order to inform that the present disclosure is counting the accumulated time properly, the controller 130 may cause the notifier 120 to generate a third light signal that is less emphasized than the first and second light signals between the start time and the replacement time.

The indicator 100 for a wiper blade may be provided in the coupling cover, and an exposed portion 17 configured to expose the light signal generated from the notifier 120 to the outside may be provided in the coupling cover.

In other words, the main body 110 and the controller 130 may be disposed inside the coupling cover 14, and the notifier 120 may include a lens 122 provided in the exposed portion 17 of the coupling cover 14. At this time, the main body 110 may be fixed by being locked or forcibly coupled to the inner surface of the coupling cover 14, and the main body 110 may be positioned between the coupling cover 14 and the elastic member 12.

In addition, in the notifier 120, the light emitting diode 121 and the lens 122 are provided separately, wherein the light emitting diode 121 may be disposed inside the coupling cover 14, and the lens 122 may be fixed to the exposed portion 17 of the coupling cover 14. Accordingly, as the light signal of the notifier 120 is exposed to the outside through the exposed portion 17 of the coupling cover 14, the user may check the replacement time of the wiper blade 1.

In this case, the exposed portion 17 or the notifier 120 may be provided to notify the need for replacement without interfering with the driving of the user. For example, the exposed portion 17 may be provided at a position that allows the light signal to be transmitted indirectly to the user in the vehicle or is visible only when the user gets out of the vehicle.

For example, in order to transmit the light signal to the user when the user gets off the driver's seat and moves away from the vehicle, the exposed portion 17 may be provided toward the side of the driver's seat (the left side of the vehicle) in the coupling cover 14.

Also, the lens 122 of the notifier 120 may be provided to lower the intensity of the light signal emitted from the light emitting diode 121 so that the user is not disturbed by the light signal while driving.

As described above, according to an embodiment, by having the indicator 100 capable of generating a light signal in the wiper blade 1 while the indicator 100 counts only the accumulated time regardless of the movement of the wiper blade 1 to inform the replacement time for the wiper blade 1, it is possible to increase safety by securing proper performance of the wiper blade 1 and also to improve user convenience by notifying the replacement time with a sufficient light signal.

Figure 7:
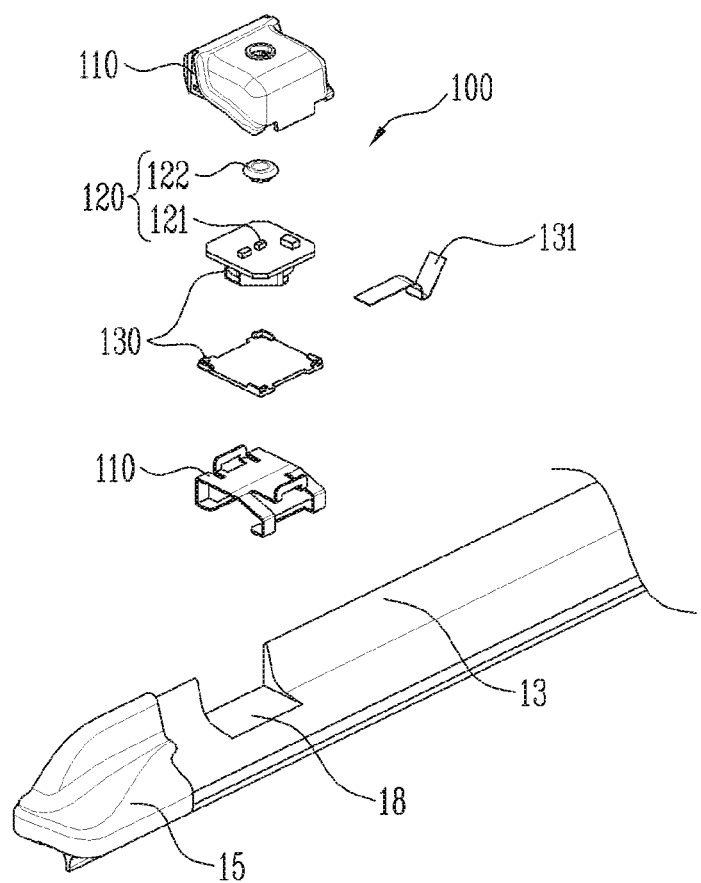
FIG. 7 illustrates a partially exploded perspective view of the wiper blade in accordance with the second embodiment of the present disclosure.

FIG. 6 illustrates a perspective view of the wiper blade in accordance with a second embodiment of the present disclosure, and FIG. 7 illustrates a partially exploded perspective view of the wiper blade in accordance with the second embodiment of the present disclosure.

Hereinafter, the embodiment of the present disclosure will be mainly described on the points that are different from the previous embodiment, and the parts omitted from the description will be replaced with the previous content. It should be noted that this is also the same in other embodiments below.

Referring to FIGS. 6 and 7, the indicator 100 for a wiper blade according to the present embodiment may be provided on the cover member 13.

Specifically, a seating portion 18 recessed to allow the main body 110 of the indicator 100 for a wiper blade to be seated therein is provided on the cover member 13 of the wiper blade 1, and the main body 110 is installed in the seating portion 18 of the cover member 13.

In other words, as shown in the drawings, the cover member 13 has a shape in which the cross section formed in the mountain shape extends in the longitudinal direction, and has a shape in which the upper end is cut off at a specific point on one side to form the seating portion 18.

In the seating portion 18, the main body 110 may be engagedly coupled, and a fastening method through a locking structure or forced fitting may be used for the coupling of the main body 110 and the seating portion 18, but the coupling structure is not limited. To this end, the main body 110 may include a lower portion coupled to the seating portion 18 and an upper portion coupled to the lower portion.

However, the cover member 13 may be provided in an asymmetric shape along the width direction. In consideration of this, the main body 110 may also be provided in an asymmetric shape. In particular, the main body 110 is formed to be in contact with the cover members 13 at both ends of the seating portion 18, thereby minimizing the gap between the main body 110 and the cover member 13.

The indicator 100 for a wiper blade is provided with a removable tab 131 as described above, and the tab 131 may be exposed to the upper portion of the cover member 13 as it extends to one side of the seating portion 18. Accordingly, the user may cause the controller 130 to start counting the accumulated time by removing the tab 131, and the notifier 120 may expose a light signal to the outside when the accumulated time reaches a predetermined time.

As such, unlike the previous embodiment, the embodiment allows the indicator 100 for a wiper blade to be provided on the cover member 13, but the basic function of the cover member 13 (prevention of the lifting of the contact member 11) may be maintained.

Figure 8:
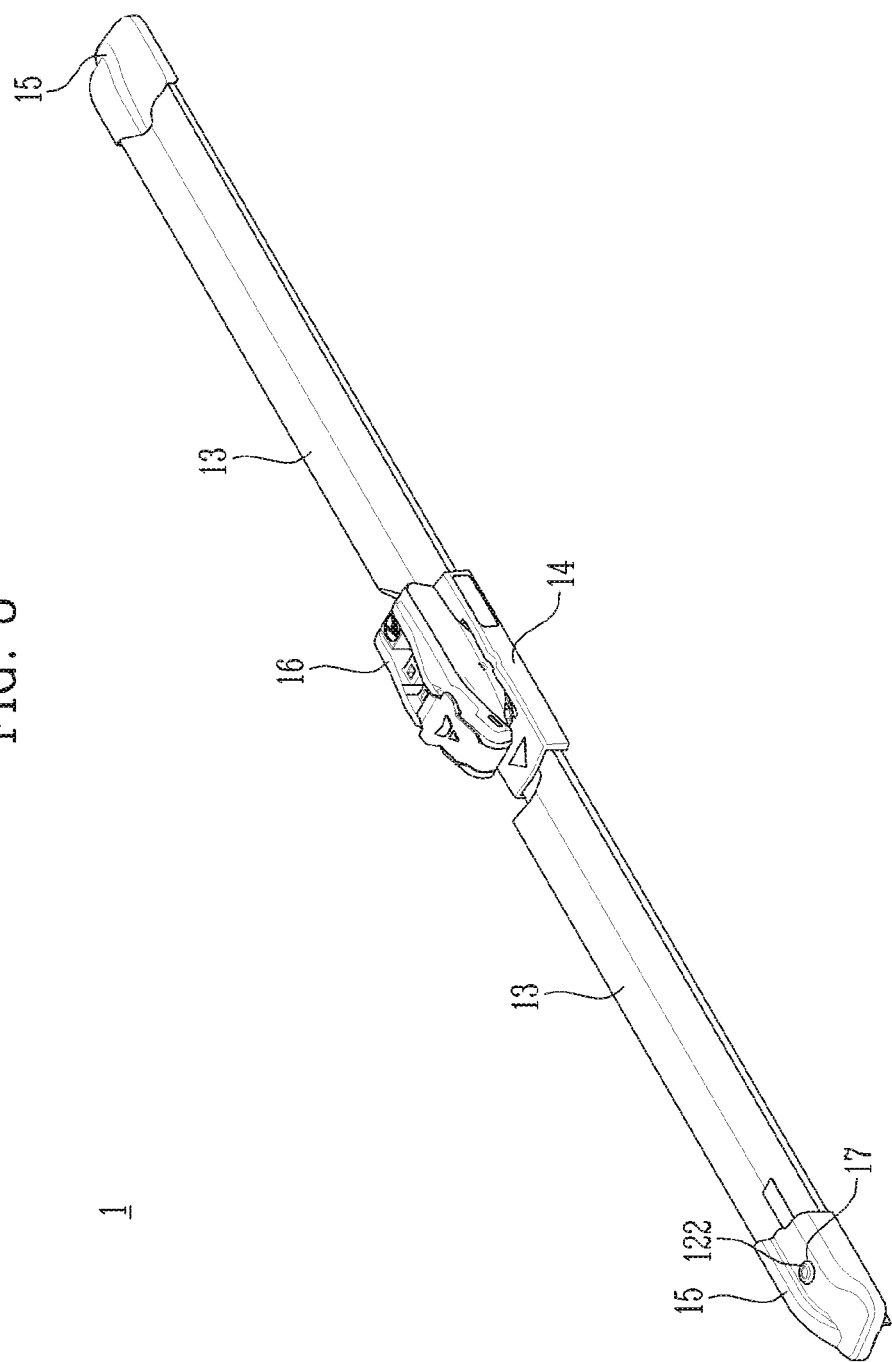
FIG. 8 illustrates a perspective view of a wiper blade in accordance with a third embodiment of the present disclosure.
Figure 9:
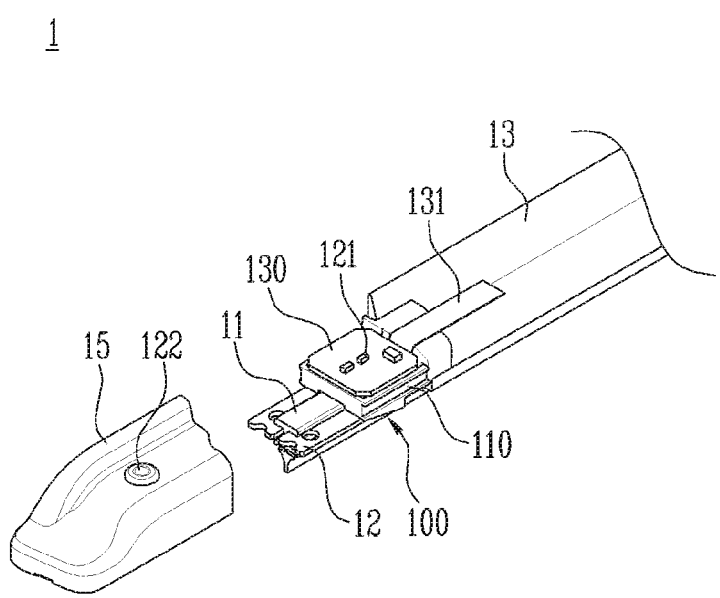
FIG. 9 illustrates a partially exploded perspective view of a wiper blade in accordance with the third embodiment of the present disclosure.

FIG. 8 illustrates a perspective view of the wiper blade in accordance with a third embodiment of the present disclosure, and FIG. 9 illustrates a partially exploded perspective view of the wiper blade in accordance with the third embodiment of the present disclosure.

Referring to FIGS. 8 and 9, the wiper blade 1 according to the third embodiment of the present disclosure may include the indicator 100 for a wiper blade in the closing cover 15.

In this case, most of the indicator 100 for a wiper blade may be disposed inside the closing cover 15, similar to the case in FIG. 2, and the exposed portion 17 may be provided on the closing cover 15 for emitting the light signal to the outside.

In other words, as shown in FIG. 9, the main body 110 of the indicator 100 for a wiper blade may be fastened to the contact member 11 or the elastic member 12, and the closing cover 15 may be coupled to the cover member 13 while accommodating the main body 110.

At this time, the lens 122 may be provided in the exposed portion 17 of the closing cover 15, and when a light signal is generated from the light emitting diode 121 provided inside the closing cover 15, the light signal may be transmitted to the user through the lens 122.

In the case of the embodiment, compared to the previous embodiment, the length of the closing cover 15 may be slightly longer, but since the shape of the cover member 13 is not deformed, it is possible to maintain a stable contact with the windshield while preventing air resistance from increasing.

Figure 10:
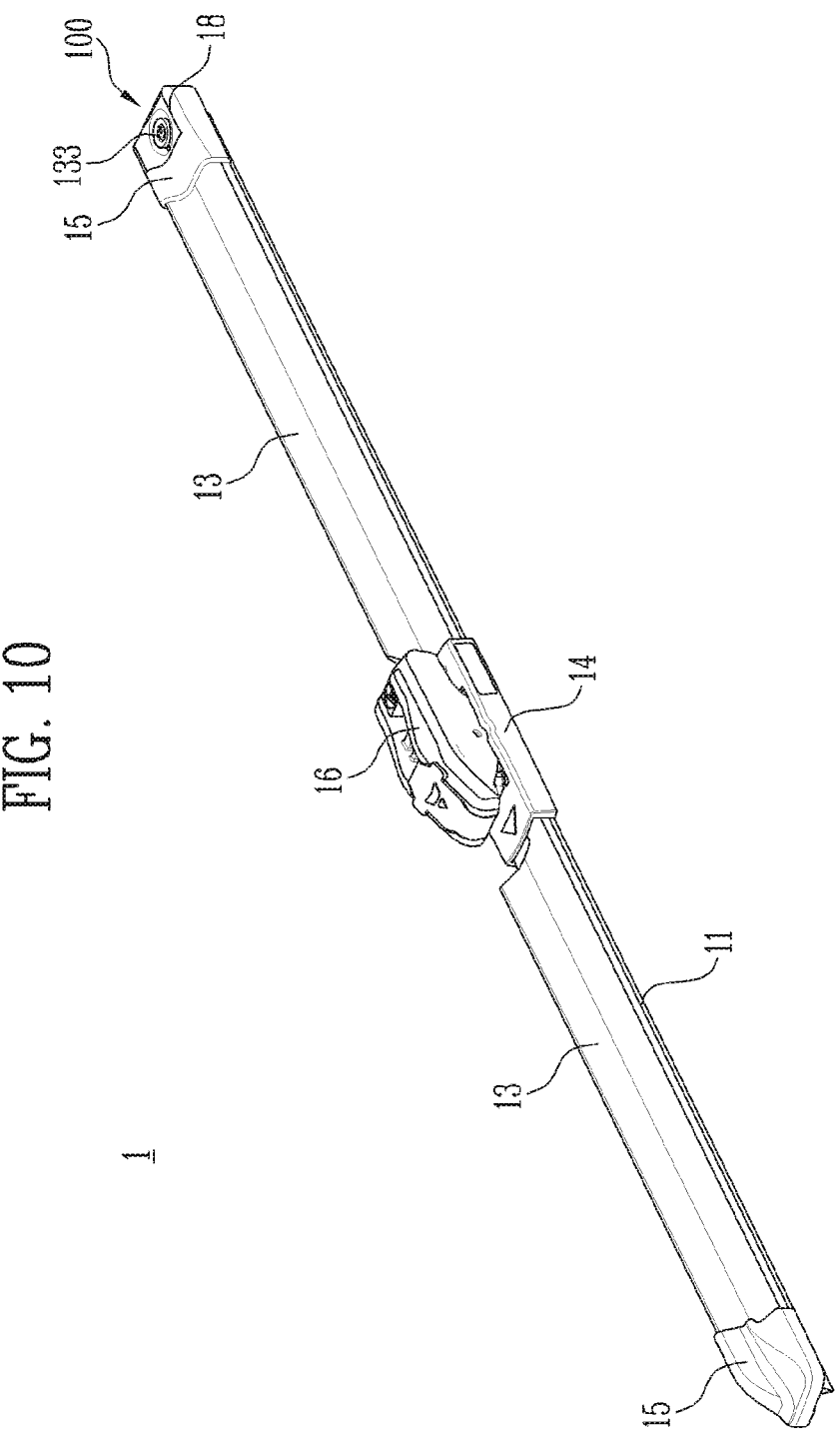
FIG. 10 illustrates a perspective view of a wiper blade in accordance with a fourth embodiment of the present disclosure.
Figure 11:
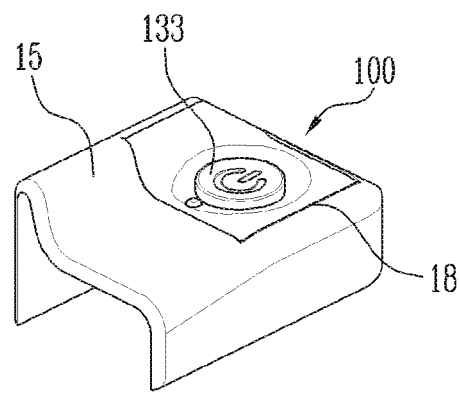
FIG. 11 illustrates a partial perspective view of the wiper blade in accordance with the fourth embodiment of the present disclosure.

FIG. 10 illustrates a perspective view of the wiper blade in accordance with a fourth embodiment of the present disclosure, and FIG. 11 illustrates a partial perspective view of the wiper blade in accordance with the fourth embodiment of the present disclosure.

Referring to FIGS. 10 and 11, in the wiper blade 1 according to the fourth embodiment of the present disclosure, the indicator 100 for a wiper blade may be provided on the closing cover 15, similar to the third embodiment.

However, in the case of the previous embodiment, as the removable tab 131 is pulled out by the user, the circuit of the controller 130 is electrified to start counting the accumulated time, whereas in the embodiment, the counting may be initiated by using a button 133.

The controller 130 of the embodiment has the button 133 partially exposed to the outside to be pressed. The button 133 may operate by pressing or touching. When the button 133 is pressed or touched by the user, the controller 130 may set the corresponding time as a start time to count the accumulated time.

In this case, the closing cover 15 of a wiper blade 1 has the seating portion 18 on which the main body 110 is placed, and the main body 110 on which the button 133 is provided is installed on the seating portion 18 so that the button (133) may be exposed to the outside. In particular, in this embodiment, the notifier 120 may be provided on the upper surface of the main body 110, and the notifier 120 may be provided integrally with the button 133.

In other words, the button 133 is partially made of a semi-transparent or transparent material, and the notifier 120 is disposed inside the button 133 to transmit the light signal to the outside through the button 133. Accordingly, when the user presses the button 133, a first light signal notifying the initiation of the accumulated time is provided to the user through the button 133, and when the accumulated time reaches a predetermined time, the second light signal may be exposed through the button 133.

As described above, in the embodiment, instead of the removable tab 131, the button 133 is used to initiate the accumulated time while the light signal is exposed through the button 133, thereby enhancing user convenience.

Figure 12:
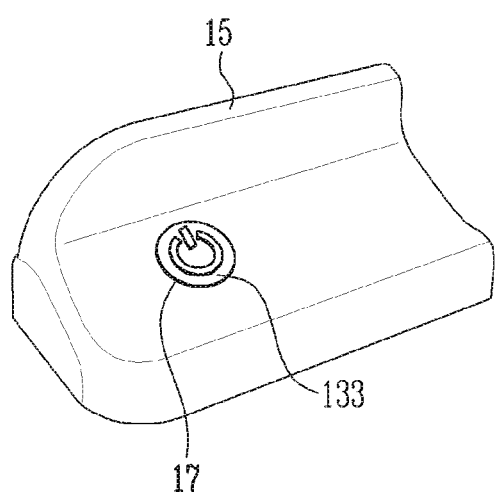
FIG. 12 illustrates a partial perspective view of a wiper blade in accordance with a fifth embodiment of the present disclosure.
Figure 13:
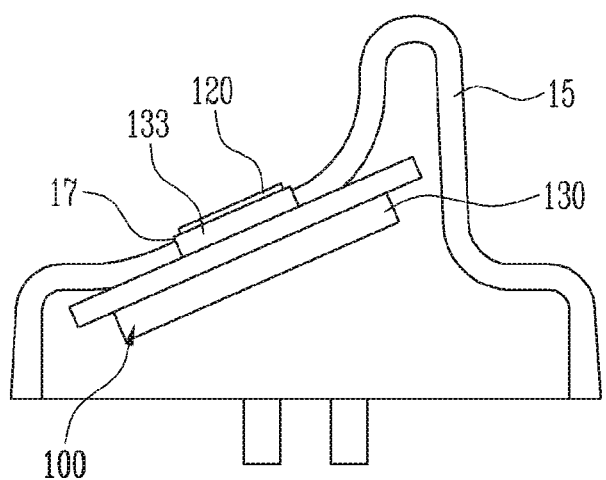
FIG. 13 illustrates a cross-sectional view of the wiper blade in accordance with the fifth embodiment of the present disclosure.

FIG. 12 illustrates a partial perspective view of the wiper blade in accordance with a fifth embodiment of the present disclosure, and FIG. 13 illustrates a cross-sectional view of the wiper blade in accordance with the fifth embodiment of the present disclosure.

Referring to FIGS. 12 and 13, the wiper blade 1 according to the fifth embodiment of the present disclosure may be built with the indicator 100 for a wiper blade in the closing cover 15, similar to the fourth embodiment.

However, as described in FIG. 2, the cover member 13 of the wiper blade 1 may have an asymmetric shape in the width direction, and thus the closing cover 15 may also form an asymmetric shape. In consideration of the shape of the closing cover 15 in the embodiment, the notifier 120 and the button 133 may be provided on the closing cover 15 in an inclined shape.

In other words, if the notifier 120 of the fourth embodiment emits the light signal in a direct upward direction, the notifier 120 of the embodiment exposes the light signal to the obliquely upward direction. Therefore, according to the embodiment, the light signal may be more easily recognized in the field of view of a user who gets off the vehicle and walks toward the windshield.

Figure 14:
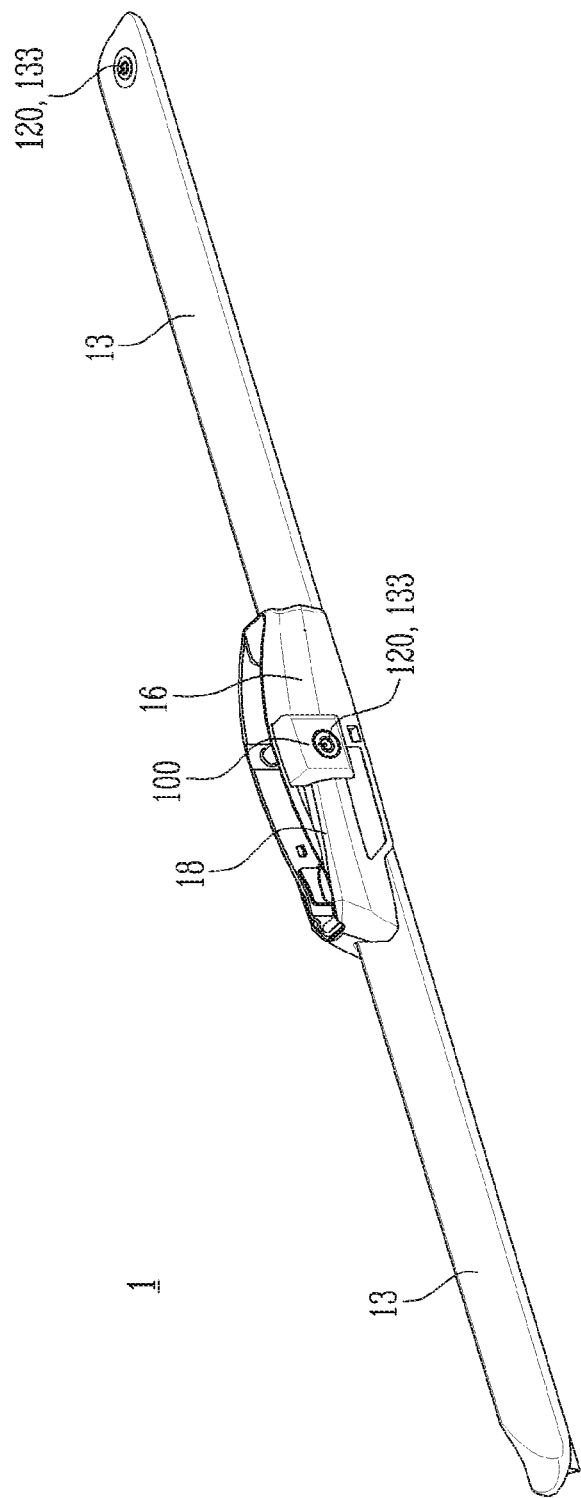
FIG. 14 illustrates a perspective view of a wiper blade in accordance with a sixth embodiment of the present disclosure.
Figure 15:
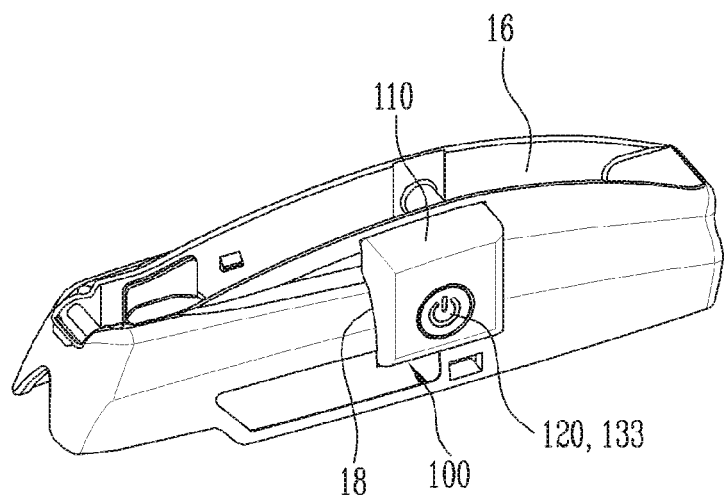
FIG. 15 illustrates a partial perspective view of the wiper blade in accordance with the sixth embodiment of the present disclosure.
Figure 16:
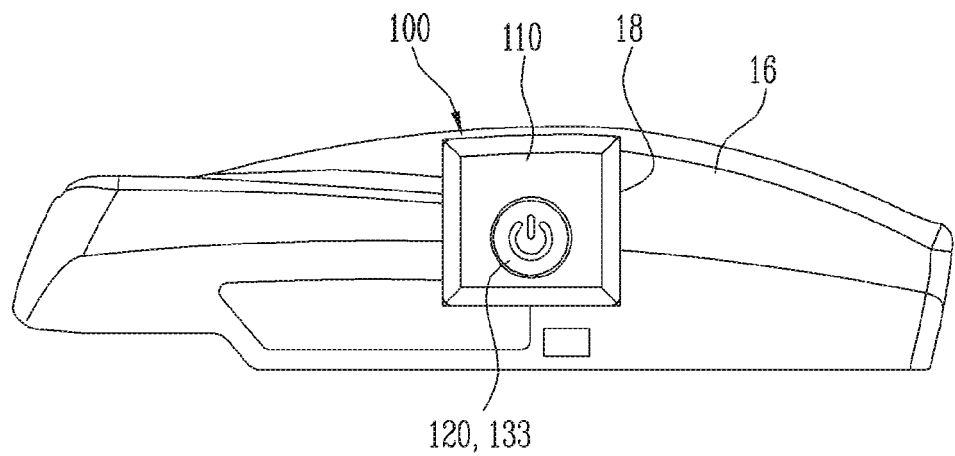
FIG. 16 illustrates a partial side view of the wiper blade in accordance with the sixth embodiment of the present disclosure.
Figure 17:
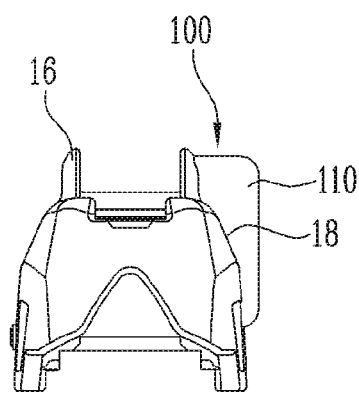
FIG. 17 illustrates a partial front view of the wiper blade in accordance with the sixth embodiment of the present disclosure.

FIG. 14 illustrates a perspective view of the wiper blade in accordance with a sixth embodiment of the present disclosure, FIG. 15 illustrates a partial perspective view of the wiper blade in accordance with the sixth embodiment of the present disclosure, FIG. 16 illustrates a partial side view of the wiper blade in accordance with the sixth embodiment of the present disclosure, and FIG. 17 illustrates a partial front view of the wiper blade in accordance with the sixth embodiment of the present disclosure.

Referring to FIGS. 14 to 17, in the wiper blade 1 according to the sixth embodiment of the present disclosure may include the indicator 100 for a wiper blade in the adapter 16.

As described above, the adapter 16 is configured to be used for fastening the wiper blade 1 to the wiper arm, and the wiper blade 1 may be hingedly rotatable with respect to the adapter 16.

At this time, since the side of the adapter 16 is exposed to the outside, in the embodiment, the light signal of the notifier 120 may be exposed through the side of the adapter 16. Specifically, the adapter 16 may be provided with the seating portion 18 to install the main body 110 of the indicator 100 for a wiper blade, and at least the notifier 120 among the button 133 and the notifier 120 may be exposed to the side in the main body 110 provided in the seating portion 18.

Accordingly, in the process of inserting the adapter 16 into the wiper arm to replace the wiper blade 1, the user may press the button 133 provided on one side of the adapter 16 to start counting the accumulated time. In other words, in the embodiment, considering that the user may grip the adapter 16 since the adapter 16 is used for the fastening and separation between the wiper blade 1 and the wiper arm, the controller 130 is disposed on the adapter 16 to facilitate the external input for the initiation of the accumulated time.

And/or the embodiment may be configured in a form that the cover member 13 closes both ends with the wiper blade 1 not including the closing cover 15, while the notifier 120 or the button 133 in the indicator 100 for a wiper blade may be disposed on one side of the cover member 13.

In this case, unlike the one described with reference to FIG. 6, the height of the main body 110 may be reduced by a method such as securing a sufficient cross section of the cover member 13 or extending the size of the main body 110 in a longitudinal direction so as to include the main body 110 in the cover member 13 without the seating portion 18. In addition, the cover member 13 may have the exposed portion 17 that allows only the button 133 and the notifier 120 to be exposed.

In the embodiment, the indicator 100 for a wiper blade may be provided in the adapter 16 and the cover member 13, respectively, but unlike the drawings, the indicator 100 for a wiper blade may be provided in at least one of both.

In addition, in the embodiment, the button 133 may be provided in the adapter 16, the notifier 120 may be disposed on at least one of the adapter 16 and the cover member 13, and the notifier 120 provided in the cover member 13 may be coupled to the controller 130 built in the adapter 16. In this way, since only the notifier 120 needs to be built in the cover member 13 without the main body 110 or the controller 130, the cover member 13 may be provided without protruding portions.

Or, conversely, it is also possible to provide the notifier 120 in the adapter 16 and the button 133 in the cover member 13, but in both cases, the main body 110 and the controller 130 may be built in the adapter 16.

Additionally, it should be noted that, in the embodiment including the button 133 in the present disclosure, the removable tab 131 may be applied instead of or together with the button 133.

Alternatively, unlike the embodiment, the main body 110 may be built in the adapter 16 instead of having the seating portion 18 on the side of the adapter 16 while having only the exposed portion 17 for exposing the light signal by the notifier 120 in the adapter 16, thereby enabling omission of the protruding portions on the side surface of the adapter 16. Instead, by allowing the notifier 120 to be disposed at an angle toward the user, the light signal may be easily identified by the user.

It should be noted that the present disclosure may sufficiently include a combination of at least two or more of the above-described embodiments or a combination of at least one embodiment and a known technology as a new embodiment.

Although the present disclosure has been described in detail with reference to certain exemplary embodiments, it is to explain the present disclosure specifically, and the present disclosure is not limited thereto. It should be apparent to those skilled in the art that various modifications can be made on the basis of the technological scope of the present disclosure in addition to the embodiments disclosed herein.

All the simple modifications or variations of the present disclosure fall within the scope of the present disclosure, and the specific scope of protection of the present disclosure will be made clear by the appended claims.

What is claimed is:

1. An indicator for a wiper blade, which is a device for the wiper blade detachably provided on a wiper arm for cleaning a windshield, the indicator comprising:
   a main body provided on the wiper blade or the wiper arm;
   a notifier provided in the main body and configured to generate a light signal that is identifiable with naked eyes; and
   a controller configured to control an operation of the notifier, wherein
   the controller is configured to
   count accumulated time from a start time at which an external operation is input regardless of whether the wiper blade operates so as to operate the notifier when the accumulated time reaches a predetermined time,
   wherein the controller is configured to cause the notifier to generate a first light signal when the start time is set, and
   cause the notifier to generate a second light signal that is the same as or more emphasized than the first light signal when the accumulated time reaches the predetermined time.

2. The indicator of claim 1, wherein the wiper blade is configured to perform cleaning by repeating a constant movement in a state of being in close contact with the windshield by means of the wiper arm rotated by a driving source, and
   the controller is configured to count only the accumulated time regardless of the movement of the wiper blade.

3. The indicator of claim 1, wherein the controller has a circuit blocked by a removable tab, and
   is configured to count the accumulated time by setting a time at which the tab is removed by an external force to make the circuit electrified as the start time.

4. The indicator of claim 1, wherein the controller has a button operated by pressing or touching, and
   is configured to count the accumulated time by setting a time at which the button is pressed or touched as the start time.

5. The indicator of claim 1, wherein the controller is configured to cause the notifier to generate a third light signal that is less emphasized than the first light signal or the second light signal from the start time until the accumulated time reaches the predetermined time.

6. The indicator of claim 1, wherein the wiper blade comprises:
   a contact member connected to an end of the wiper arm through an adapter and configured to be in close contact with the windshield;
   an elastic member configured to provide an elastic force in a direction of being in close contact with the contact member;

a cover member configured to cover the elastic member; and a coupling cover provided in the center and to which the adapter is coupled, wherein the main body is provided on at least one of the cover member and the coupling cover, and an exposed portion configured to expose the light signal of the notifier to the outside is provided on the cover member or the coupling cover.

7. The indicator of claim 1, wherein the wiper blade comprises:

a contact member configured to be in close contact with the windshield;

an elastic member configured to provide an elastic force in a direction of being in close contact with the contact member; and a cover member configured to cover the elastic member, wherein the cover member has a seating portion recessed to allow the main body to be seated therein, and the main body is installed in the seating portion of the cover member to expose the light signal of the notifier to the outside.

8. The indicator of claim 1, wherein the wiper blade comprises:

a contact member configured to be in close contact with the windshield;

an elastic member configured to provide an elastic force in a direction of being in close contact with the contact member;

a cover member configured to cover the elastic member; and a closing cover provided on each of both ends of the cover member in its longitudinal direction, wherein the main body is provided on at least one of the cover member and the closing cover, and an exposed portion configured to expose the light signal of the notifier to the outside is provided on the cover member or the closing cover.

9. The indicator of claim 1, wherein the wiper blade is coupled to an end of the wiper arm through an adapter, the adapter has a seating portion recessed to allow the main body to be seated therein, and the main body is installed in the seating portion of the adapter to expose the light signal of the notifier to the outside.

10. The indicator of claim 1, wherein the wiper blade is coupled to an end of the wiper arm through an adapter, the main body is provided in the adapter, and an exposed portion configured to expose the light signal of the notifier to the outside is provided in the adapter.

11. A wiper blade in which the indicator of claim 1 is provided.

* * * * *